July 4, 1950     W. P. HOWLAND     2,514,241
CHUCK COLLET ADAPTER
Filed Dec. 5, 1946     2 Sheets-Sheet 1
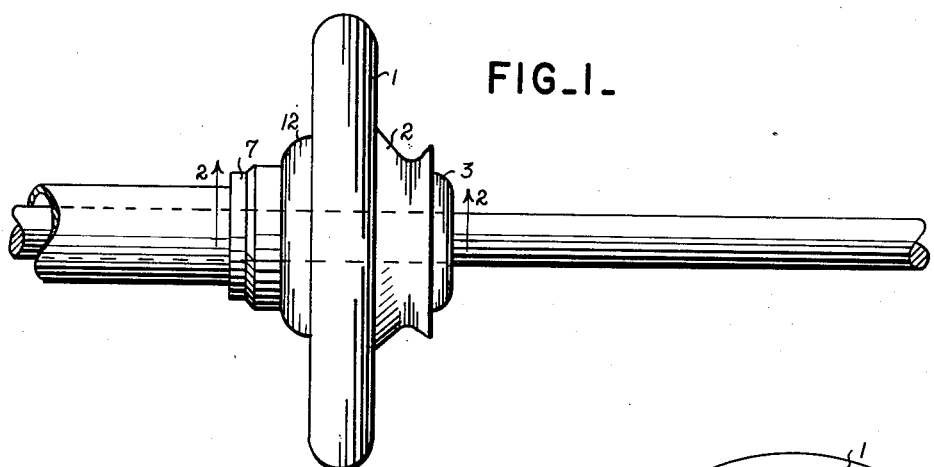
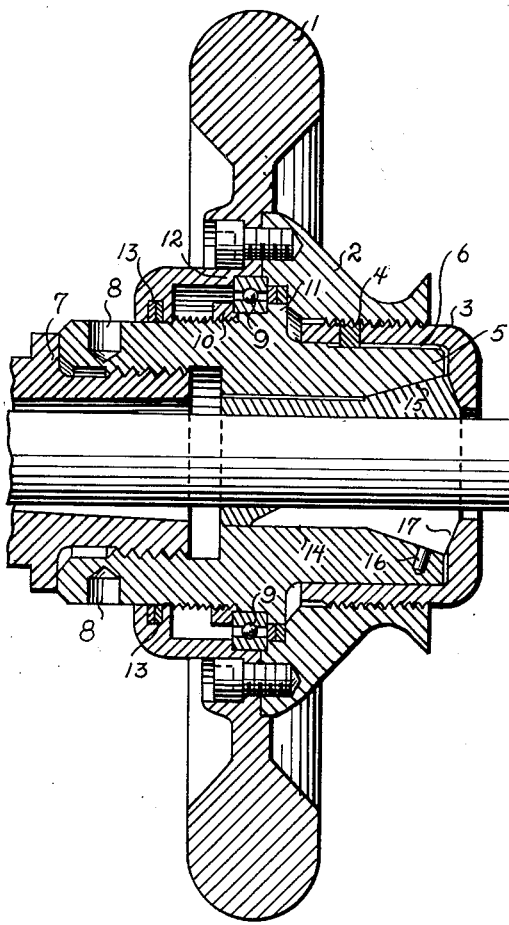
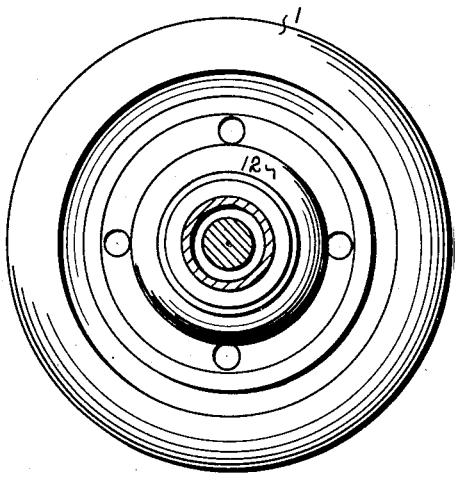
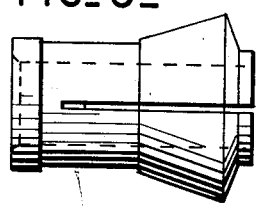
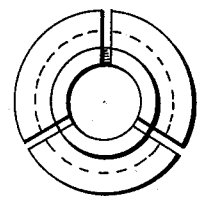
INVENTOR.
WAYNE P. HOWLAND.
BY *Victor J. Evans & Co.*
ATTORNEYS

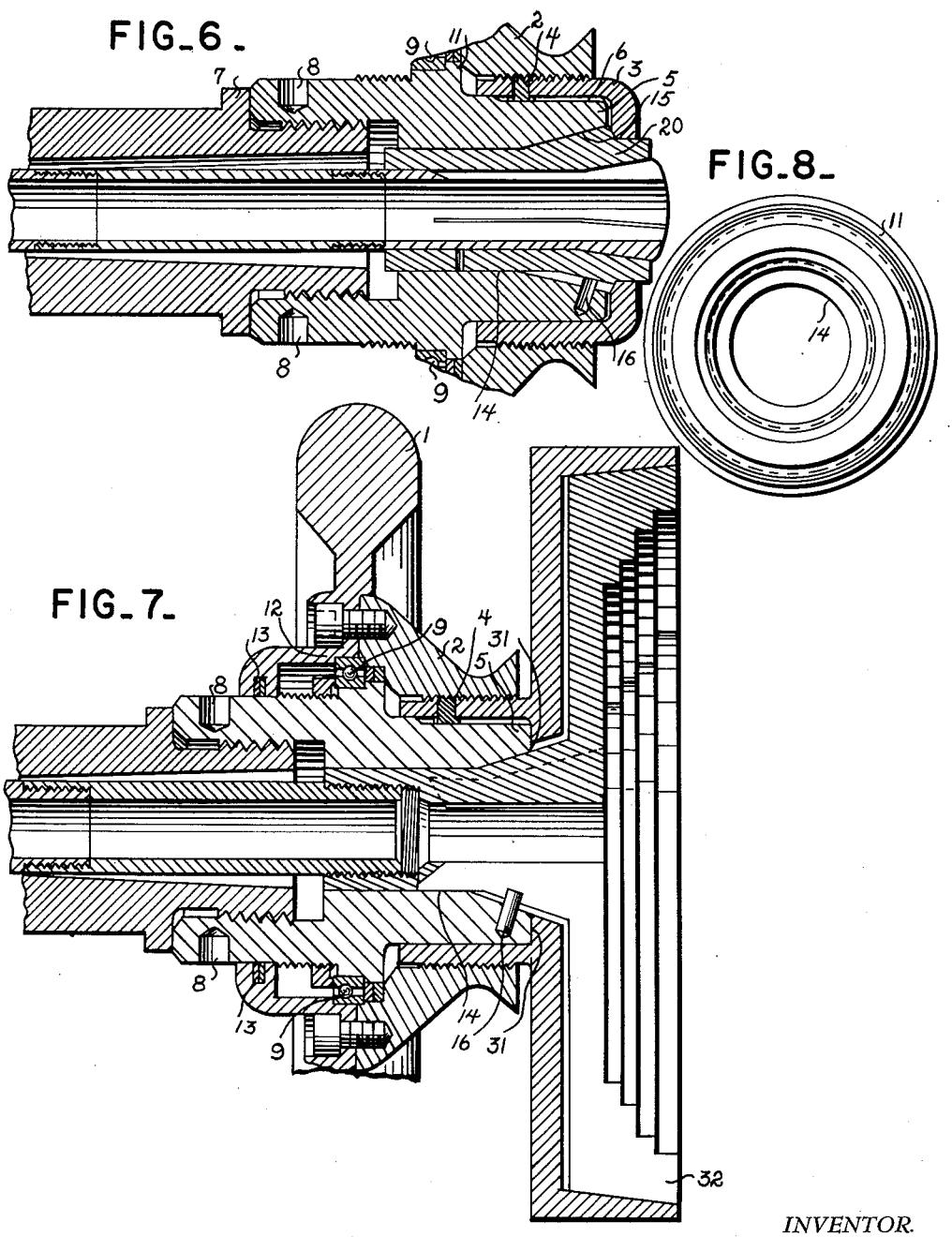

Patented July 4, 1950

2,514,241

UNITED STATES PATENT OFFICE 2,514,241

CHUCK COLLET ADAPTER

Wayne P. Howland, Sayre, Pa.

Application December 5, 1946, Serial No. 714,325

1 Claim. (Cl. 279—49)

This invention relates to improvements in bench lathes, engine lathes, milling machines, and index and dividing heads.

In the usual lathe the hole through the spindle limits the size of collet which can be used, there being an appreciable amount of space lost in the spindle when the largest size of collet the spindle is capable of accommodating is used.

It is, therefore, an object of this invention to provide an adapter which can be attached to a lathe spindle to enable the use of a large range of collets, and thus increase the capacity of the spindle. The adapter is attached to the nose of the machine live spindle, utilizing a push type collet, which does not enter the spindle hole, but is supported in the adapter body at the end of the spindle.

A further object is to provide an adapter for lathe spindles which can be quickly and conveniently attached or detached to accommodate collets of many sizes.

These and other objects are attained by the novel construction and arrangement of parts hereinafter described and illustrated by the accompanying drawings, forming a part hereof, and in which:

Fig. 1 is a side view of an adapter embodying the invention.

Fig. 2 is a sectional view taken on the line 2—2 of Fig. 1.

Fig. 3 is an end view of the structure shown in Fig. 1.

Fig. 4 is an end view of a collet used in the device.

Fig. 5 is a side view of the collet.

Fig. 6 is a sectional view of an adapter for use with any standard type of draw-in collet.

Fig. 7 is a sectional view of an adapter arrangement for use with a step chuck.

Fig. 8 is an end view of the adapter shown in Fig. 6.

Referring to the drawings, the collet adapter is shown to comprise a handwheel 1, made of aluminum or the like, which is attached by bolts to a draw sleeve 2, which is in threaded engagement with a collet closer 3, which is cup shaped with an opening to receive the work. A key 4 in the collet closer moves in a slot in the adapter body 5, the key and slot preventing rotation of the collet closer. See slot 6.

The adapter body 5 threadedly engages the spindle 7, and is provided with holes 8 to receive a spanner wrench for attaching or detaching the body to a spindle.

About midway of the outer diameter of the body 5 is a shoulder 11 against which bears a radial thrust ball bearing 9, which also bears against a shoulder 12 on the handwheel 1, the casing being held in place by a retaining nut 10. The draw sleeve is provided with a groove to receive a grease retainer and dust shield 13.

The hole 14 in the adapter body is about one-fourth inch greater diameter than the hole through the live lathe spindle, and the outer portion of the hole is finished to a 30° included angle taper, the larger diameter of the tapered hole being at the outer free face of the body. A hole 16 is reamed at a convenient place in the tapered portion 15 of the body to receive a key to be used when a standard type of draw-in collet is used to prevent rotation thereof. The inner face 17 of the collet closer 3 is finished to a 15° angle to correspond to the shape of the collet at its outer end, and the hole in the collet closer is slightly larger than the maximum size stock to be used.

In operation, to insert a collet, the draw sleeve is rotated by the handwheel 1 to cause the collet closer 3 to move outward to a position where it can be removed. The collet is then inserted in the collet space in the adapter body and the collet closer is replaced. The hand wheel is then rotated in an opposite direction to cause the draw sleeve to draw the collet closer against the collet. Before the closer reaches the collet, the stock or work should be inserted in the collet. The hand wheel is then turned until it will turn no more. The work is then securely held in the collet. To release the work, the spindle is locked so that it will not revolve, and the hand wheel is turned to move the collet closer outwardly.

In Fig. 6 is shown an arrangement for use of any particular or standard draw-in collet which is held in a special inner adapter. In this form a round key is inserted into the hole drilled in the tapered portion of the adapter body. The inner adapter is then inserted into the adapter body in place of the regular collet. The inner adapter being finished to the same dimensions as the hole, it will run as true as the hole in the body. It is held securely by placing the collet closer against it. The hole in the inner adapter is finished to the size required to accommodate any particular type of draw-in collet. The collet is then inserted and pulled in to hold any work securely by using the draw spindle. An extension is provided to screw on the inner end of the regular draw spindle to make up the difference between the location of the threaded end of the draw-in collet when used in the lathe spindle adapter.

In Fig. 7 is shown an attachment for using a step chuck. The step chuck closer 30 takes the place of the collet closer. It is a hub having the same dimensions and fitting the body in the same manner. Instead of being operated in the same manner as the collet closer, it draws onto the front end of the body by turning the hand wheel until its inner shoulder 31 bears against the front end of the adapter body. The hand wheel is not turned again until it is desired to remove the closer from the adapter body. The size of the closer is optional. However, regardless of size, it has a 5 degree taper machined in it with the large diameter of the taper on the outside edge.

The step chuck 32 is machined to the same diameter as the tapered opening of the closer. The thickness should be less in order to prevent it from bottoming in the closer. The only bearing it has in the closer is on the 5 degree taper. The hub of the step chuck extends back into the adapter body the same as a push type collet. The inner end of the step chuck hub is tapped to receive the threaded end of a draw spindle in the same manner as a draw in collet. Three saw slots are milled completely through from the center hold in the hub to the outside of the step chuck and lengthwise through the hub as far as the tapped portion will permit. These are 1/8 inch wide and are equally spaced. Any one of them can be used as a key way and is to be introduced over the key which is inserted in the tapered part of the body.

The above description is to be considered as illustrative and not limitative of the invention, of which modifications can be made without departing from the spirit and scope of the invention as set forth in the appended claim.

The invention having been described, what is claimed is:

In an adapter for lathe spindles, an adapter body adapted to be screwed to a spindle, said body having a hole with its outer end tapered to receive a collet, a collet closer mounted on the body, a key and slot arrangement to allow sliding movement and prevent rotation of the closer on the body, a draw sleeve threadedly engaging the closer, a hand wheel secured to the draw sleeve, a thrust bearing mounted on said adapter and engaging said hand wheel, a retaining nut on said adapter for retaining said bearing in position said closer having a tapered inner surface adapted to engage the tapered surface of a collet a key in the tapered portion of the body adapted to engage the collet to prevent rotation thereof and the closer having an opening of greater diameter than the work to be received by the collet.

WAYNE P. HOWLAND.

REFERENCES CITED

The following references are of record in the file of this patent:

UNITED STATES PATENTS

| Number | Name | Date |
| --- | --- | --- |
| 1,330,998 | Bolender | Feb. 17, 1920 |
| 2,210,092 | Miller | Aug. 6, 1940 |
| 2,228,685 | Benjamin | Jan. 14, 1941 |
| 2,337,471 | Hines | Dec. 21, 1943 |
| 2,345,069 | Phillips | Mar. 28, 1944 |
| 2,391,550 | Cope | Dec. 25, 1945 |